(12) United States Patent
Muto et al.

(10) Patent No.: US 7,373,922 B2
(45) Date of Patent: May 20, 2008

(54) INTAKE AIR AMOUNT CONTROL APPARATUS AND INTAKE AIR AMOUNT CONTROL METHOD OF INTERNAL COMBUSTION ENGINE

(75) Inventors: Harufumi Muto, Nishikamo-gun (JP); Yuji Miyanoo, Seto (JP); Akira Eiraku, Susono (JP); Masashi Hakariya, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/568,947

(22) PCT Filed: Jul. 30, 2004

(86) PCT No.: PCT/JP2004/011276

§ 371 (c)(1),
(2), (4) Date: Feb. 22, 2006

(87) PCT Pub. No.: WO2005/019625

PCT Pub. Date: Mar. 3, 2005

(65) Prior Publication Data

US 2006/0276954 A1    Dec. 7, 2006

(30) Foreign Application Priority Data

Aug. 26, 2003  (JP) .............................. 2003-301459

(51) Int. Cl.
*F02D 41/24* (2006.01)
*F02D 9/00* (2006.01)

(52) U.S. Cl. ...................... 123/399; 123/346; 123/348; 701/110

(58) Field of Classification Search ................ 123/399, 123/345–350, 90.11, 90.15, 90.16, 90.17, 123/568.11, 568.14; 73/117.3, 118.2; 701/106, 701/110, 115
See application file for complete search history.

(56) References Cited

U.S. PATENT DOCUMENTS

| 6,502,543 | B1 | 1/2003 | Arai et al. |
| 6,986,337 | B2* | 1/2006 | Muto .......................... 123/350 |
| 7,051,709 | B1* | 5/2006 | Muto et al. .................. 123/399 |
| 7,200,486 | B2* | 4/2007 | Tanaka et al. .............. 701/109 |

FOREIGN PATENT DOCUMENTS

| CN | 1335912 A | 2/2002 |
| JP | A 2001-41095 | 2/2001 |
| JP | A 2002-180892 | 6/2002 |

(Continued)

*Primary Examiner*—Hai Huynh
(74) *Attorney, Agent, or Firm*—Oliff & Berridge, PLC

(57) ABSTRACT

An apparatus and method for controlling the intake air amount in an internal combustion engine provided with a throttle valve and an intake air amount changing means linked with the same, the intake air amount control apparatus and method of an internal combustion engine finding a target intake air amount mcta based on an accelerator opening degree and engine speed (step 101), determining a target setting Cvta for said intake air amount changing means based on at least said target intake air amount (step 103), and finding a target throttle opening degree θtta based on model equations creating a model of an engine intake system and expressing the air passing through the engine intake system from said target intake air amount mcta and the target setting Cvta (step 107).

14 Claims, 7 Drawing Sheets

FOREIGN PATENT DOCUMENTS

| | | |
|---|---|---|
| JP | A 2002-303177 | 10/2002 |
| JP | A 2002-309992 | 10/2002 |
| JP | A 2002-309993 | 10/2002 |
| JP | A 2002-332872 | 11/2002 |
| JP | 2005-16316 * | 1/2005 |
| WO | WO 01/40642 A1 | 6/2001 |

* cited by examiner

INTAKE AIR AMOUNT CONTROL APPARATUS AND INTAKE AIR AMOUNT CONTROL METHOD OF INTERNAL COMBUSTION ENGINE

TECHNICAL FIELD

The present invention relates to an intake air amount control apparatus and intake air amount control method of an internal combustion engine.

BACKGROUND ART

In recent years, for the purpose of improvement of fuel efficiency etc., there has been known an internal combustion engine designed to control the intake air amount by cooperative control of a throttle valve and another mechanism. As such a mechanism, there is typically a variable valve operation mechanism for controlling the opening characteristics of an intake valve or exhaust valve, but there are also a variable cylinder number mechanism or variable exhaust volume mechanism etc.

Further, such an additional mechanism for controlling the intake air amount generally is set to a state in accordance with the intake air amount set in accordance with the accelerator opening degree etc. (that is, the target intake air amount) and the operating state of the internal combustion engine so that the fuel efficiency, emission, torque fluctuation, and other conditions become optimal, but an internal combustion engine itself is expected to operate (or generate torque) in accordance with the operation of the accelerator pedal by the driver, so it is necessary to realize the target intake air amount corresponding to the accelerator opening degree no matter what state the mechanism is set to. That is, it is necessary to find the opening degree of the throttle valve for realizing the target intake air amount corresponding to the setting of the mechanism (that is, the target throttle opening degree) and adjust the opening degree of the throttle valve to that opening degree.

As a method for finding the target opening degree of a throttle valve, for example Japanese Unexamined Patent Publication (Kokai) No. 2002-309993 discloses the method of successively calculating a required torque from the accelerator opening degree, a target intake air amount from the required torque, a target intake pressure from the target intake air amount, and a target opening degree of a throttle valve from the target intake pressure, by using an intake system model. However, what Japanese Unexamined Patent Publication (Kokai) No. 2002-309993 discloses is the case of using just a throttle valve to control the intake air amount. This does not correspond to a case of provision of an additional mechanism for controlling the intake air amount.

On the other hand, as a method for finding a target opening degree of a throttle valve able to deal with even the case of provision of such a mechanism, there is the method of creating in advance a map of the target opening degree using the target intake air amount and indicators of the operating state as arguments and finding it based on that map. However, in practice, preparing such a map requires tremendous time. In particular, when providing a mechanism such as explained above, indicators of its setting are added as indicators of the operating state, so the amount of the mapping work becomes extremely large. Further, if reducing the arguments or the number of measurement points so as to reduce the amount of the mapping work, the accuracy of the target opening degree obtained is liable to fall.

DISCLOSURE OF THE INVENTION

The present invention was made in view of such a problem and has as its object the provision of an intake air amount control apparatus and intake air amount control method for an internal combustion engine provided with a throttle valve and an intake air amount changing means linked with the same, the intake air amount control apparatus and intake air amount control method designed so as to find a target opening degree of a throttle valve in accordance with a setting of an intake air amount changing means by a novel method with none of the above problems.

The present invention provides as means for solving the above problems an intake air amount control apparatus or intake air amount control method for an internal combustion engine as set forth in the claims of the claim section.

According to a first aspect of the present invention, there is provided an apparatus for controlling an intake air amount in an internal combustion engine provided with a throttle valve and an intake air amount changing means linked with the throttle valve, the intake air amount control apparatus for an internal combustion engine being provided with model equations creating a model of an engine intake system and expressing air passing through the engine intake system and further having a means for finding a target intake air amount based on an accelerator opening degree and engine speed, a means for determining a target setting for the intake air amount changing means based on at least the target intake air amount, and a means for finding a target throttle opening degree, which is a throttle opening degree for realizing the target intake air amount, from the target intake air amount and the target setting based on the model equations.

According to the present embodiment, in an internal combustion engine provided with a throttle valve and an intake air amount changing means linked with the throttle valve, the target throttle opening degree for when controlling the intake air amount can be found from the target intake air amount and the target setting based on model equations creating a model of an engine intake system and expressing the air passing through the engine intake system. Due to this, compared with the past, the amount of work for creating a map required for finding the target throttle opening degree can be slashed and further the target throttle opening degree can be found with relatively good accuracy.

Note that the "intake air amount" referred to in this description is the amount of air taken into the combustion chambers of all cylinders during operation of the internal combustion engine. For that reason, for example, it is possible to change the intake air amount by making some of the cylinders idle. Further, the intake air amount can be expressed for example by the cylinder filling air amount, cylinder intake air flow rate, cylinder air filling rate, etc.

In the second aspect of the present invention, the means for finding the target throttle opening degree has a means for finding a target intake pipe internal pressure, which is an intake pipe internal pressure at a downstream side of throttle valve for realizing the target intake air amount when the intake air amount changing means is set to the target setting, based on the target intake air amount and the target setting, and a means for finding the target throttle opening degree based on the target intake air amount and the target intake pipe internal pressure.

In this aspect as well, actions and effects substantially the same as those of the first aspect can be obtained.

In a third aspect of the present invention, as the model equations, the apparatus has a first equation expressing a relationship between an intake pipe internal pressure on the downstream side of the throttle valve and a throttle valve passage air flow rate and determined in accordance with a throttle opening degree and a second equation expressing a relationship between an intake pipe internal pressure on the downstream side of the throttle valve and a cylinder intake air flow rate and determined in accordance with at least a setting of the intake air amount changing means and an engine speed.

In this aspect as well, actions and effects substantially the same as those of the first aspect can be obtained.

In a fourth aspect of the present invention, the means for finding the target intake air amount has a means for finding a reference target throttle opening degree, which is a target throttle opening degree in the case where the intake air amount changing means is set to a predetermined reference state, based on the accelerator opening degree and the engine speed, finds the cylinder intake air flow rate for when the throttle valve passage air flow rate found based on the first equation determined by the reference target throttle opening degree found by the means for finding the reference target throttle opening degree and the cylinder intake air flow rate found based on the second equation determined by at least the engine speed assuming that the intake air amount changing means is set to the reference state become equal with respect to the same intake pipe internal pressure at the downstream side of the throttle valve, and makes the cylinder intake air flow rate the target intake air amount or makes a value converted from the cylinder intake air flow rate the target intake air amount.

According to this aspect, it is possible to set a target intake air amount in accordance with the intent of the driver.

In a fifth aspect of the present invention, the means for finding the target throttle opening degree has a means for finding a target intake pipe internal pressure, which is the intake pipe internal pressure on the downstream side of the throttle valve for realizing the target intake air amount when the intake air amount changing means is set to the target setting, based on the target intake air amount and the target setting, and the means for finding the target intake pipe internal pressure finds the target intake pipe internal pressure by entering the target intake air amount expressed by the cylinder intake air flow rate into the second equation determined by at least the engine speed assuming that the intake air amount changing means is set to the target setting.

According to this aspect, it is possible to find the target intake pipe internal pressure by relatively simple calculation in the process of finding the target throttle opening degree.

In a sixth aspect of the present invention, the means for finding the target throttle opening degree further has a means for finding the target throttle opening degree based on the target intake air amount and the target intake pipe internal pressure, and the means uses the target intake air amount expressed by the cylinder intake air flow rate and the target intake pipe internal pressure to find the target throttle opening degree based on the first equation.

In this aspect as well, actions and effects substantially the same as those of the first aspect can be obtained.

In a seventh aspect of the present invention, the intake air amount changing means is an opening characteristic control means for controlling an opening characteristic of at least one of an intake valve and exhaust valve.

According to this aspect, in an internal combustion engine provided with a throttle valve and an opening characteristic control means, the target throttle opening degree for when controlling the intake air amount can be found from the target intake air amount and the target setting (more specifically a target opening characteristic) based on model equations creating a model of an engine intake system and expressing the air passing through the engine intake system. Due to this, compared with the past, the amount of work for creating a map required for finding the target throttle opening degree can be slashed and further the target throttle opening degree can be found with relatively good accuracy. Note that, in this description, "opening characteristic" means one or more of the valve lift, operating angle, and valve operating timing.

In an eighth aspect of the present invention, there is provided a method for controlling an intake air amount in an internal combustion engine provided with a throttle valve and an intake air amount changing means linked with the throttle valve, the intake air amount control method for an internal combustion engine provided with a step of finding a target intake air amount based on an accelerator opening degree and engine speed, a step determining a target setting for the intake air amount changing means based on at least the target intake air amount, and a step of finding a target throttle opening degree, which is a throttle opening degree for realizing the target intake air amount, from the target intake air amount and the target setting based on model equations creating a model of an engine intake system and expressing air passing through the engine intake system.

In this aspect as well, actions and effects substantially the same as those of the first aspect can be obtained.

In a ninth aspect of the present invention, the step of finding the target throttle opening degree has a step of finding a target intake pipe internal pressure, which is an intake pipe internal pressure at a downstream side of the throttle valve for realizing the target intake air amount when the intake air amount changing means is set to the target setting based on the target intake air amount and the target setting, and a step of finding the target throttle opening degree based on the target intake air amount and the target intake pipe internal pressure.

In this aspect as well, actions and effects substantially the same as those of the first aspect can be obtained.

In a 10th aspect of the present invention, as the model equations, a first equation expressing a relationship between an intake pipe internal pressure on the downstream side of the throttle valve and a throttle valve passage air flow rate and determined in accordance with a throttle opening degree and a second equation expressing a relationship between an intake pipe internal pressure on the downstream side of the throttle valve and a cylinder intake air flow rate and determined in accordance with at least a setting of the intake air amount changing means and an engine speed are at least, used.

In this aspect as well, actions and effects substantially the same as those of the first aspect can be obtained.

In an 11th aspect of the present invention, the step of finding the target intake air amount has a step of finding a reference target throttle opening degree, which is a target throttle opening degree in the case where the intake air amount changing means is set to a predetermined reference state, based on the accelerator opening degree and the engine speed, in the step of finding the target intake air amount, the cylinder intake air flow rate is found for when the throttle valve passage air flow rate found based on the first equation determined by the reference target throttle opening degree and the cylinder intake air flow rate found based on the second equation determined by at least the engine speed assuming that the intake air amount changing means is set to the reference state become equal with respect to the same intake pipe internal pressure at the downstream side of the throttle valve, the cylinder intake air flow rate is made the target intake air amount, or a value converted from the cylinder intake air flow rate is made the target intake air amount.

According to this aspect, it is possible to set a target intake air amount in accordance with the intent of the driver.

In a 12th aspect of the present invention, the step of finding the target throttle opening degree has a step of finding a target intake pipe internal pressure, which is an intake pipe internal pressure on the downstream side of the throttle valve for realizing the target intake air amount when the intake air amount changing means is set to the target setting, based on the target intake air amount and the target setting, in the step of finding the target intake pipe internal pressure, the target intake pipe internal pressure is found by entering the target intake air amount expressed by the cylinder intake air flow rate into the second equation determined by at least the engine speed assuming that the intake air amount changing means is set to the target setting.

According to this aspect, it is possible to find the target intake pipe internal pressure by relatively simple calculation in the process of finding the target throttle opening degree.

In a 13th aspect of the present invention, the step of finding the target throttle opening degree further has a step of finding the target throttle opening degree based on the target intake air amount and the target intake pipe internal pressure, in the step of finding the target throttle opening degree, the target intake air amount expressed by the cylinder intake air flow rate and the target intake pipe internal pressure are used to find the target throttle opening degree based on the first equation.

In this aspect as well, actions and effects substantially the same as those of the first aspect can be obtained.

In a 14th aspect of the present invention, the intake air amount changing means is an opening characteristic control means for controlling an opening characteristic of at least one of an intake valve and exhaust valve.

In this aspect as well, actions and effects substantially the same as those of the seventh aspect can be obtained.

Below, the present invention will be more fully understood from the attached drawings and the description of the preferred embodiments of the present invention.

BEST MODE FOR WORKING THE INVENTION

Figure 1:
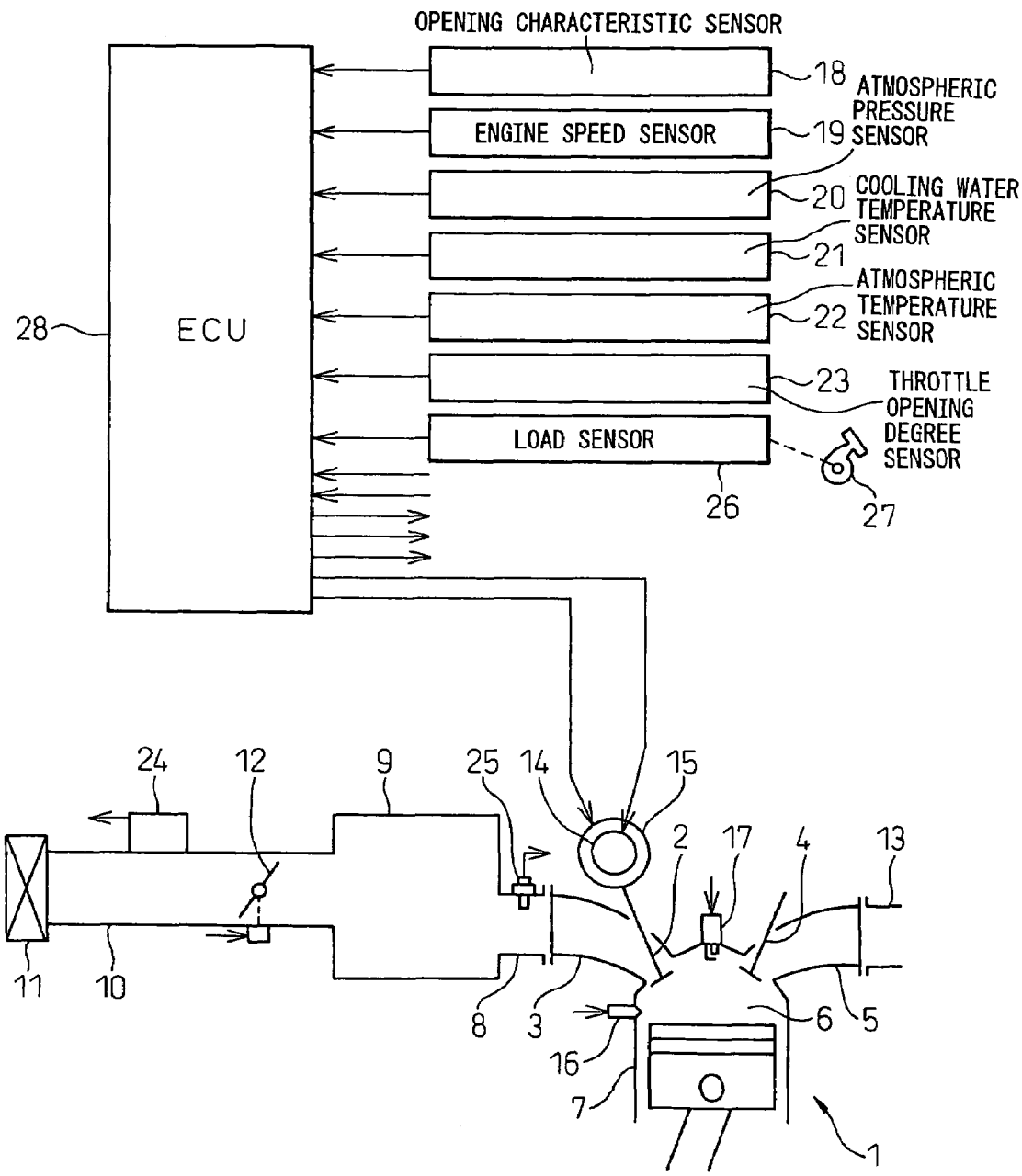
FIG. 1 is a schematic view of an example of the case of applying the present invention to an in-cylinder injection spark ignition internal combustion engine.

Below, embodiments of the present invention will be explained in detail with reference to the drawings. Note that, in the drawings, the same or similar components are assigned common reference numerals.

FIG. 1 is a schematic view of an example of the case of application of the present invention to an in-cylinder injection spark ignition internal combustion engine. Note that the present invention may also be applied to another spark ignition internal combustion engine or to a compression ignition internal combustion engine.

In FIG. 1, 1 indicates an internal combustion engine body, 2 indicates an intake valve, 3 indicates an intake port, 4 indicates an exhaust valve, 5 indicates an exhaust port, and 6 indicates a combustion chamber formed in a cylinder 7. An intake port 3 of each cylinder is connected through a downstream side intake pipe 8 to a surge tank 9, while the surge tank 9 is connected through an upstream side intake pipe 10 to an air cleaner 11. The intake pipe 10 has a throttle valve 12 disposed in it. On the other hand, an exhaust port 5 of each cylinder is connected to an exhaust pipe 13.

Further, 14 indicates a valve lift changer for changing the valve lift. That is, in the present embodiment, by operating the valve lift changer 14, the valve lift of the intake valve 2 can be controlled.

If operating the valve lift changer 14 so as to change the valve lift of an intake valve 2, this is accompanied with a change in the opening area of the intake valve 2. In an intake valve 2 of the present embodiment, an increase in the valve lift is accompanied with an increase in the opening area of the intake valve 2. Further, as will be explained later, in the present embodiment, if the valve lift changer 14 is used to change the valve lift of an intake valve 2, this is accompanied with a change in the operating angle of the intake valve 2 as well.

On the other hand, 15 indicates an operating timing shifter for shifting the operating timing without changing the valve lift and operating angle of an intake valve 2. That is, by operating the operating timing shifter 15, the operating timing of the intake valve 2 can be shifted to the advanced side or shifted to the delayed side and due to this the valve overlap can be adjusted.

16 indicates a fuel injector, 17 indicates a spark plug, 18 indicates an opening characteristic sensor for detecting a valve lift and operating angle and a shift of operating timing of the intake valve 2, and 19 indicates an engine speed sensor for detecting an engine speed. 20 indicates an atmospheric pressure sensor for detecting a pressure of the atmosphere around the internal combustion engine, 21 indicates a cooling water temperature sensor for detecting the temperature of the internal combustion engine cooling water, and 22 indicates an atmospheric temperature sensor for detecting the temperature of the atmosphere around the internal combustion engine. 23 indicates a throttle opening degree sensor for detecting the opening degree of the throttle valve 12, 24 indicates an air flow meter, and 25 indicates an intake pipe internal pressure sensor for detecting the pressure inside the intake pipe at the downstream side from the throttle valve 12. 26 indicates a load sensor connected to an accelerator pedal 27 and generates an output proportional to the amount of depression of the accelerator pedal 27 (below, called "accelerator depression"). 28 indicates an ECU (electronic control unit). As shown in FIG. 1, the outputs of the above sensors are input to the ECU 28.

In the present embodiment, each fuel injector 16 is connected to the ECU 28. A signal from the ECU 28 may be used to control the amount of fuel injected or the injection timing. Similarly, each spark plug 17 is connected to the ECU 28. A signal from the ECU 28 may be used to control the ignition timing. Further, the opening degree of the throttle valve 12 may be changed without regard as to the accelerator depression. By adjusting the throttle opening degree, the pressure in the intake pipe at the downstream side of the throttle valve can be controlled.

Figure 2:
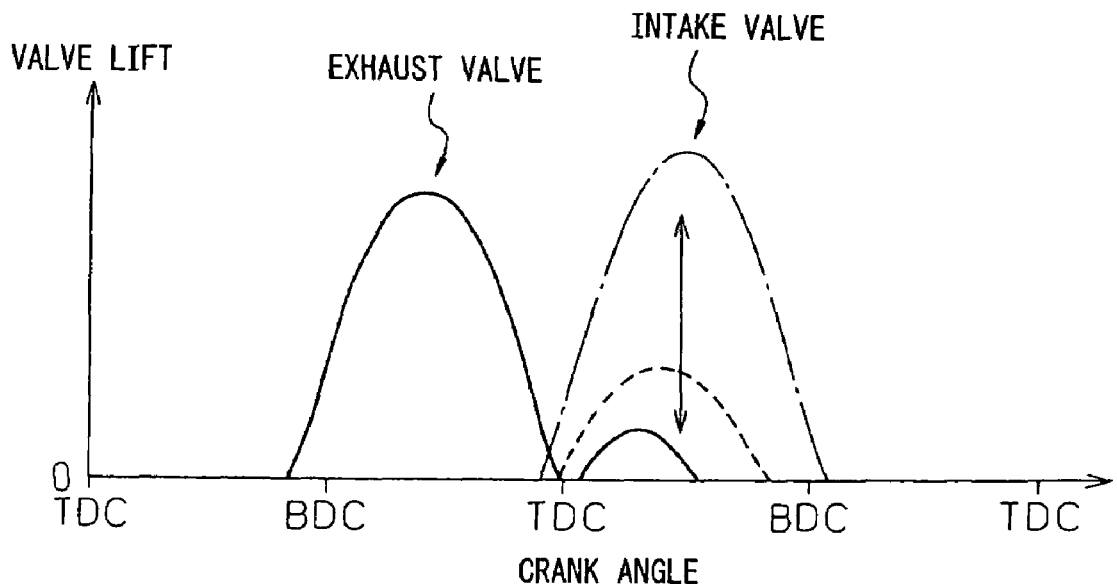
FIG. 2 is a view of the state of change of a valve lift and operating angle of an intake valve along with operation of a valve lift changer.

FIG. 2 is a view of the state of change of the valve lift of an intake valve 2 accompanying operation of the valve lift changer 14. As shown in FIG. 2, the valve lift changer 14 enables the valve lift of an intake valve 2 to be continuously changed. Further, as explained above, in the present embodiment, a change in the valve lift is accompanied with a change in the operating angle corresponding to the opening period of an intake valve 2. More specifically, an increase in the valve lift of an intake valve 2 is accompanied with an increase in the operating angle of the intake valve 2 (solid line→broken line→one-dot chain line). Therefore, in the present embodiment, the valve lift changer 14 forms both the lift control means and the operating angle control means.

Further, in the present embodiment, operation of the valve lift changer 14 is accompanied with a change in the timing at which the valve lift of an intake valve 2 peaks. More specifically, as shown in FIG. 2, an increase in the valve lift of the intake valve 2 is accompanied with a delay in the timing at which the valve lift of the intake valve 2 peaks.

Figure 3:
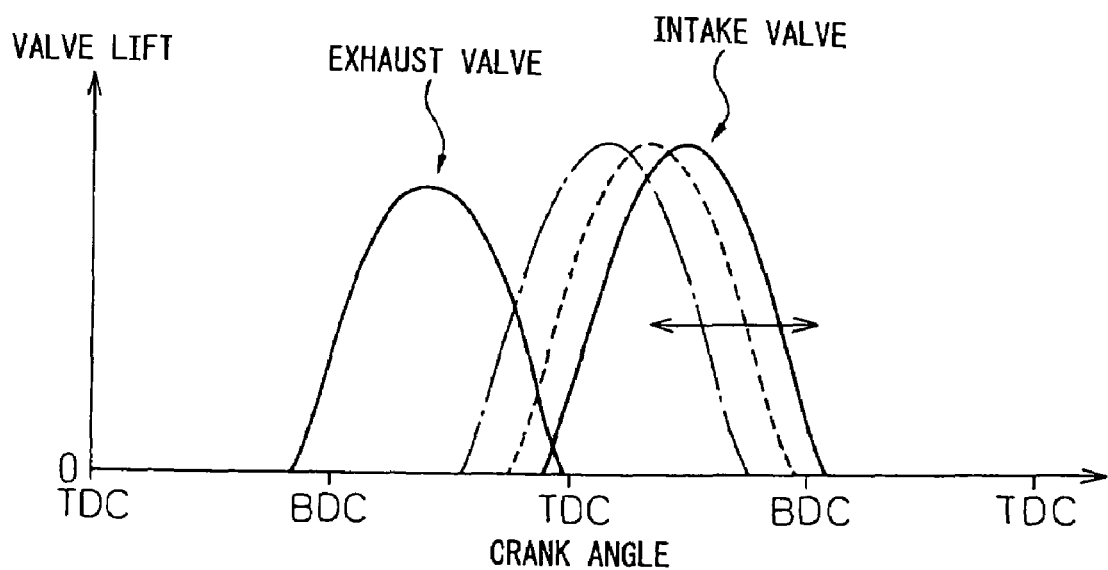
FIG. 3 is a view of the state of shift of an operating timing of an intake valve along with operation of an operating timing shifter.

FIG. 3 is a view of the state of shift of the operating timing of an intake valve 2 accompanying operation of the operating timing shifter 15. As shown in FIG. 3, the operating timing shifter 15 enables the operating timing of an intake valve 2 to be continuously changed. As this time, the operating angle of the intake valve 2 is not changed.

In the present embodiment, the amount of air taken into the combustion chamber 6 of each cylinder can be controlled by cooperative control of opening characteristics of the intake valve 2 (lift, operating angle, and valve timing) and an opening degree of the throttle valve 12 (more specifically, the intake pipe internal pressure on the downstream side of the throttle valve). That is, the intake air amount of the internal combustion engine can be controlled by cooperative control of opening characteristics of the intake valves 2 and an opening degree of the throttle valve 12. Further, in another embodiment, in addition to these, an opening degree of an idle speed-control valve (not shown) may be controlled to control the intake air amount.

However, in recent years, the creation of models of intake systems of internal combustion engines by fluid dynamics etc. and use of those models to calculate control parameters for control of the internal combustion engines have been studied. That is, for example, for an intake system of an internal combustion engine, a throttle model, intake pipe model, intake valve model, etc. have been constructed to find model equations expressing the air passing through the intake system, these model equations have been used to calculate the parameters required for various types of control, and these parameters have been used for control of the internal combustion engine.

Further, in the present embodiment as well, in the configuration shown in FIG. 1, a model of the intake system is created by the models of the throttle model, intake pipe model, and intake valve model and model equations such as explained below have been provided. Below, the models and model equations will be explained.

Figure 4:
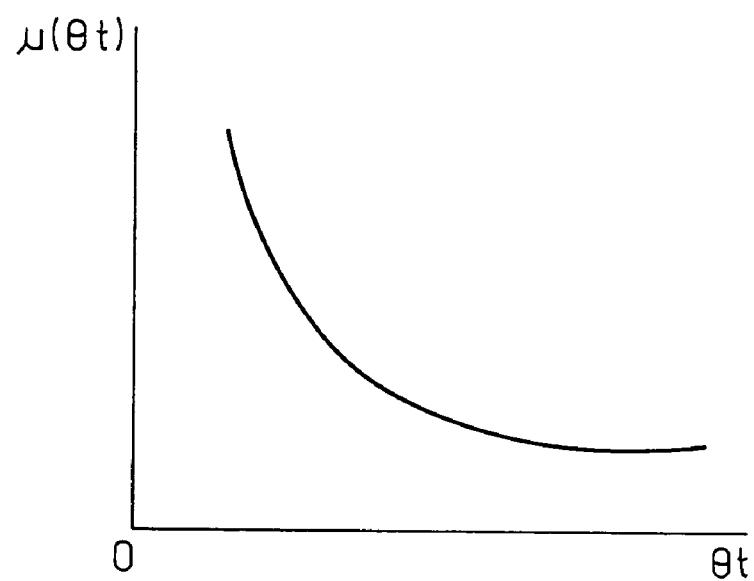
FIG. 4 is a view of the relationship between a throttle opening degree and a flow rate coefficient.

First, the throttle model will be explained. The throttle model is a model of the throttle valve. According to this, the throttle valve passage air flow rate mt (g/s) is expressed by the following equation (1). Here, Pac (kPa) is the intake pipe internal pressure at the upstream side of the throttle valve 12 (below, called the "upstream side intake pipe internal pressure") and is a value found considering at least the pressure loss of the air cleaner 11. Further, Ta (K) is the atmospheric temperature, Pm (kPa) is the intake pipe internal pressure at the downstream side from the throttle valve (below, called "the downstream side intake pipe internal pressure"), and R is the gas constant. Further, μ is the flow rate coefficient in the throttle valve and is a function of the throttle opening degree θt and determined from a map such as shown in FIG. 4. Further, At (m²) is the cross-sectional area of the opening of the throttle valve (below, called the "throttle opening area") and is a function of the throttle opening degree θt. Note that if making μ·ΔAt combining these flow rate coefficient μ and throttle opening area At a function F(θt) having only the throttle opening degree θt as a variable, equation (1) can be rewritten to equation (2). Further, if finding the value of this function F(θt) by experiments, simulation, etc. and creating in advance a map having θt as an argument, that map may be used to find the value of F(θt) from the throttle opening degree θt.

$$mt = \mu \cdot At \cdot \frac{Pac}{\sqrt{R \cdot Ta}} \cdot \Phi\left(\frac{Pm}{Pac}\right) \quad (1)$$

$$mt = F(\theta t) \cdot \frac{Pac}{\sqrt{R \cdot Ta}} \cdot \Phi\left(\frac{Pm}{Pac}\right) \quad (2)$$

Figure 5:
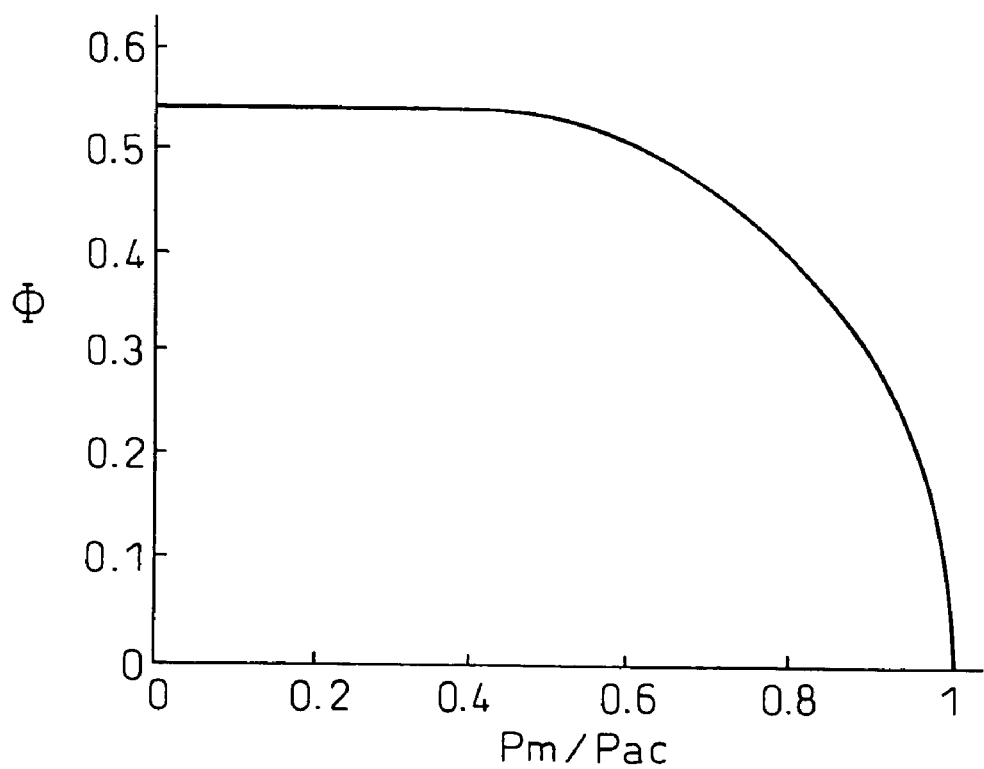
FIG. 5 is a view of a function $\Phi(Pm/Pac)$.

Φ(Pm/Pac) is a function shown in the following equation (3). The κ in this equation (3) is the ratio of specific heat (κ=Cp (isobaric specific heat)/Cv (isochloric specific heat), constant value). This function Φ(Pm/Pac) can be expressed by the graph such as shown in FIG. 5. So such a graph is stored as a map in the ECU 28 and, in practice, it is also possible not to use equation (3) for calculation, but to find Φ(Pm/Pac) from the map.

$$\Phi\left(\frac{Pm}{Pac}\right) = \begin{cases} \sqrt{\dfrac{\kappa}{2(\kappa+1)}} & \cdots \dfrac{Pm}{Pac} \leq \dfrac{1}{\kappa+1} \\ \sqrt{\left\{\left(\dfrac{\kappa-1}{2\kappa}\right) \cdot \left(1 - \dfrac{Pm}{Pac}\right) + \dfrac{Pm}{Pac}\right\} \cdot \left(1 - \dfrac{Pm}{Pac}\right)} & \cdots \dfrac{Pm}{Pac} > \dfrac{1}{\kappa+1} \end{cases} \quad (3)$$

Figure 6:
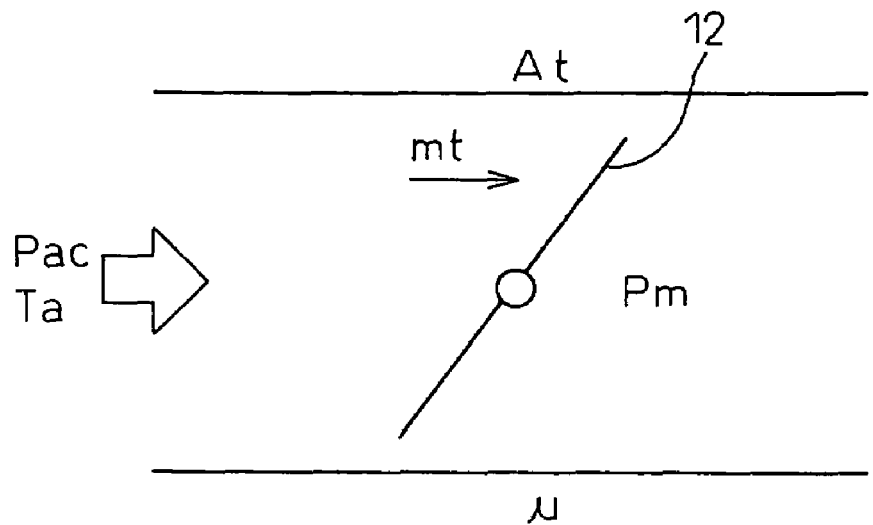
FIG. 6 is a view of a basic concept of a throttle model.

The model equations of the throttle model, that is, equation (1) to equation (3), are obtained by applying the Law of the Conservation of Mass, Law of the Conservation of Energy, and Law of the Conservation of Motion and further utilizing the state equation of a gas, formula defining the specific heat ratio, and Mayer's relation to the model of the throttle valve 12 shown in FIG. 6 assuming the pressure of the gas upstream of the throttle valve 12 to be upstream side intake pipe internal pressure Pac, the temperature of the gas upstream of the throttle valve 12 to be the atmospheric temperature Ta, and the pressure of the gas passing through the throttle valve 12 to be the downstream side intake pipe internal pressure Pm.

Note that here the pressure of the gas upstream of the throttle valve 12 used is not the atmospheric pressure Pa, but the upstream side intake pipe internal pressure Pac because the actual pressure at the upstream side of the throttle valve 12 becomes a pressure lower than the atmospheric pressure Pa during engine operation since there is pressure loss at the upstream side of the throttle valve in an engine intake system. Further, particularly, in the configuration shown in FIG. 1, since the upstream most part of the engine intake system is provided with an air cleaner 11, to more accurately find the throttle valve passage air flow rate mt, it may be considered more preferable to use the upstream side intake pipe internal pressure Pac found considering at least the pressure loss of the air cleaner 11.

In this regard, the upstream side intake pipe internal pressure Pac may be detected by providing a pressure sensor directly upstream of the throttle valve 12, but may also be calculated without using a pressure sensor. That is, the difference between the atmospheric pressure Pa and the upstream side intake pipe internal pressure Pac can be expressed as shown in the following equation (4) by Bernoulli's equation.

$$Pa - Pac = \frac{1}{2}\rho v^2 = k\frac{Ga^2}{\rho} \tag{4}$$

Here, $\rho$ is the atmospheric density, v is the flow velocity of air passing through the air cleaner 11, Ga is the flow rate of air passing through the air cleaner 11, and k is a proportional coefficient of v and Ga. If using the standard atmospheric density $\rho 0$ and the pressure correction coefficient ekpa and temperature correction coefficient ektha for converting the standard atmospheric density $\rho 0$ to the atmospheric density $\rho$, equation (4) can be rewritten to the following equation (5). Further, equation (5) can be rewritten to the following equation (6) using the function f(Ga) having only the flow rate Ga as a variable. Further, if finding the values of this function f(Ga) by experiments, simulation, etc. and creating in advance a map having Ga as an argument, it is possible to find the value of f(Ga) from the flow rate Ga based on that map.

$$Pa - Pac = \frac{k}{\rho 0} \cdot Ga^2 \cdot \frac{1}{ekpa \cdot ektha} \tag{5}$$

$$Pa - Pac = \frac{f(Ga)}{ekpa \cdot ektha} \tag{6}$$

Equation (6) can be modified to the following equation (7) showing the upstream side intake pipe internal pressure Pac. In equation (7), the flow rate Ga can be detected by the air flow meter 24 at the downstream side of the air cleaner 11. Further, that flow rate Ga can be used to find the value of f(Ga) from the above-mentioned map of f(Ga). Further, the pressure correction coefficient ekpa can be set by the detected atmospheric pressure Pa, while the temperature correction coefficient ektha can be set by the detected atmospheric temperature Ta.

$$Pac = Pa - \frac{f(Ga)}{ekpa \cdot ektha} \tag{7}$$

Further, in equation (7), the flow rate Ga of air passing through the air cleaner 11 can be considered the throttle valve passage air flow rate mt, so equation (7) can be modified to the following equation (8).

$$Pac = Pa - \frac{f(mt)}{ekpa \cdot ektha} \tag{8}$$

Further, the flow rate Ga is proportional to the engine speed NE and the later explained cylinder air filling rate Kl, so if making j a proportional coefficient, equation (7) can be modified as in the following equation (9).

$$Pac = Pa - \frac{f(j \cdot NE \cdot Kl)}{ekpa \cdot ektha} \tag{9}$$

Next, the intake pipe model will be explained. The intake pipe model is a model of the part of the intake pipe 8 etc. from the throttle valve 12 to the intake valve 2 (below, called the "intake pipe part 8'"). According to this, model equations like the following equation (10) and equation (11) are obtained for the downstream side intake pipe internal pressure Pm (kPa) and downstream side intake pipe internal temperature Tm (K). Here, mc (g/s) is the cylinder intake air flow rate, while Vm (m³) is a constant equal to the volume of the intake pipe part 8'.

$$\frac{d}{dt}\left(\frac{Pm}{Tm}\right) = \frac{R}{Vm} \cdot (mt - mc) \tag{10}$$

$$\frac{dPm}{dt} = \kappa \cdot \frac{R}{Vm} \cdot (mt \cdot Ta - mc \cdot Tm) \tag{11}$$

Figure 7:
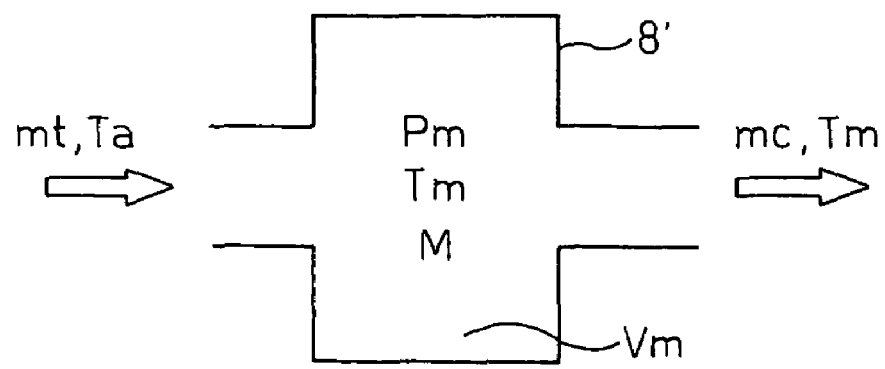
FIG. 7 is a view of a basic concept of an intake pipe model.

Here, the intake pipe model will be explained with reference to FIG. 7. If the total amount of gas of the intake pipe part 8' is M, since the change in the total amount of gas along with time is equal to the difference between the flow rate of gas flowing into the intake pipe part 8', that is, the throttle valve passage air flow rate mt, and the flow rate of gas flowing out from the intake pipe part 8', that is, the cylinder intake air flow rate mc, due to the Law of the Conservation of Mass, the following equation (12) is obtained. From this equation (12) and the gas state equation (Pm·Vm=M·R·Tm), equation (10) is obtained.

$$\frac{dM}{dt} = mt - mc \tag{12}$$

Further, the amount of change of the energy M·Cv·Tm of the gas of the intake pipe part 8' along with time is equal to the difference between the energy of the gas flowing into the intake pipe part 8' and the energy of the gas flowing out from the intake pipe part 8'. For this reason, if the temperature of the gas flowing into the intake pipe part 8' is the atmospheric temperature Ta and the temperature of the gas flowing out from the intake pipe part 8' is the downstream side intake pipe internal temperature Tm, due to the Law of the Conservation of Energy, the following equation (13) is obtained. From this equation (13) and the gas state equation, equation (11) is obtained.

$$\frac{d(M \cdot Cv \cdot Tm)}{dt} = Cp \cdot mt \cdot Ta - Cp \cdot mc \cdot Ta \quad (13)$$

Finally, the intake valve model will be explained. The intake valve model is a model of an intake valve. According to this, the cylinder intake air flow rate mc is expressed by a model equation such as the following equation (14). A and B in equation (14) are compliance parameters determined based on at least engine speed NE and can be found by preparing a map in advance and searching through the map in accordance with need. Note that in the present embodiment, as explained above, each intake valve 2 is provided with a valve lift changer 14 and operating timing shifter 15 to enable the opening characteristics such as the valve lift and operating timing of the intake valve 2 to be changed, so the compliance parameters A and B are determined based on the setting of the opening characteristics of the intake valve 2.

$$mc = A \cdot Pm - B \quad (14)$$

Figure 8:
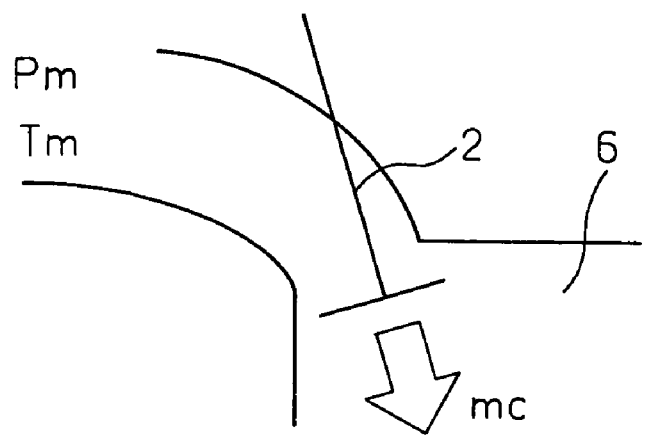
FIG. 8 is a view of a basic concept of an intake valve model.

The above-mentioned intake valve model will be explained referring to FIG. 8. In general, the amount of air filled in a combustion chamber 6 when the intake valve 2 is closed, that is, the cylinder filling air amount Mc, is determined when the intake valve 2 is closed (at the time of intake valve closing) and is proportional to the pressure in the combustion chamber 6 at the time of intake valve closing. Further, the pressure inside the combustion chamber 6 at the time of intake valve closing can be deemed equal to that pressure of the gas upstream of the intake valve, that is, the downstream side intake pipe internal pressure Pm. Therefore, the cylinder filling air amount Mc can be approximated as being proportional to the downstream side intake pipe internal pressure Pm.

Here, if making the average amount of all of the air flowing out from the intake pipe part 8' per unit time or the amount of air taken into all of the combustion chambers 6 from the intake pipe part 8' per unit time averaged over the intake stroke of one cylinder the cylinder intake air flow rate mc (explained in detail below), since the cylinder filling air amount Mc is proportional to the downstream side intake pipe internal pressure Pm, the cylinder intake air flow rate mc can also be considered proportional to the downstream side intake pipe internal pressure Pm. From this, based on theory and the rule of thumb, the equation (14) is obtained. Note that the compliance parameter A in equation (14) is a proportional coefficient, while the compliance parameter B is a value relating to the amount of burned gas remaining in the combustion chamber 6 at the time of closing of an exhaust valve.

Note that it is learned that by making both the compliance parameters A and B two different values for the case where the downstream side intake pipe internal pressure Pm is large and the case where it is small even for the same engine speed etc. (for example, A1, B1 and A2, B2), that is, by expressing the cylinder intake air flow rate mc by two equations like equation (14) (that is, linear equation of the downstream side intake pipe internal pressure Pm), the cylinder intake air flow rate mc can be found more accurately in some cases. This is believed to be related to the fact that when in particular there is a period where an intake valve 2 and a exhaust valve 4 are both open (that is, valve overlap), the burned gas flows back to the intake port 3. That is, in the case where there is valve overlap, when the downstream side intake pipe internal pressure Pm is a predetermined pressure or more, the higher the downstream side intake pipe internal pressure Pm, the more remarkably the back flow of the burned gas is reduced, so compared with when it is less than the predetermined pressure, the value of A is made larger and the value of B is made smaller.

Figure 9:
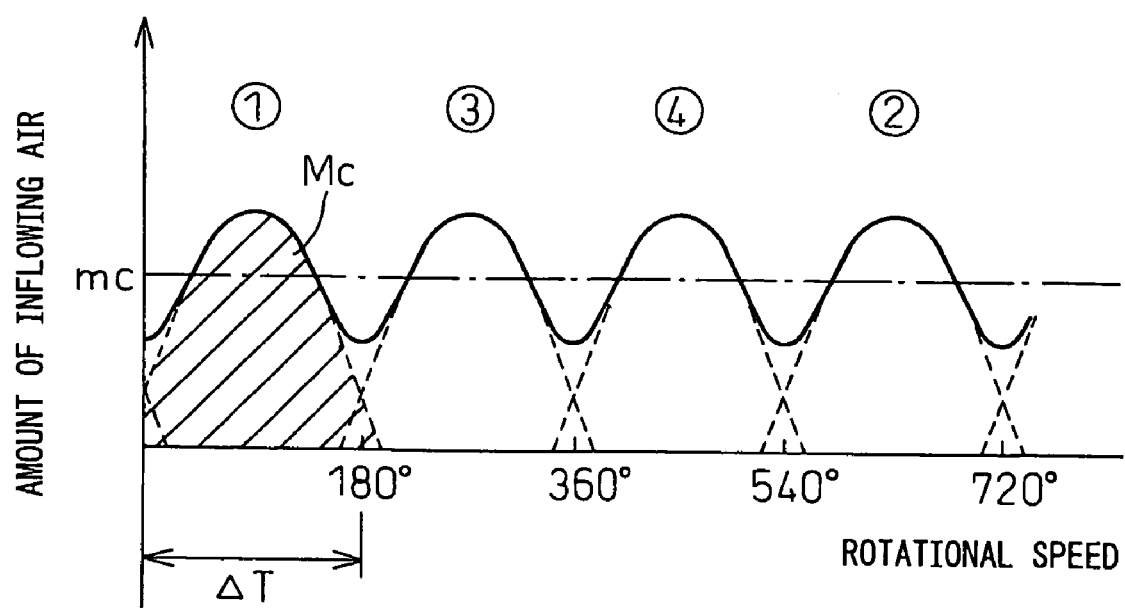
FIG. 9 is a view relating to definitions of a cylinder filling air amount and a cylinder intake air flow rate.

Here, the cylinder intake air flow rate mc will be explained with reference to FIG. 9 for the case where the internal combustion engine has four cylinders. Note that, in FIG. 9, the abscissa indicates the rotational angle of the crank shaft and the ordinate indicates the amount of air actually flowing from the intake pipe part 8' to the combustion chambers 6 per unit time. As shown in FIG. 9, in a four-cylinder internal combustion engine, the intake valves 2 for example open in the order of the #1 cylinder, #3 cylinder, #4 cylinder, and #2 cylinder. Air flows into the combustion chambers 6 of the cylinders from the intake pipe part 8' in accordance with the amounts of opening of the intake valves 2 corresponding to those cylinders. The changes in the flow rates of the air flowing from the intake pipe part 8' to the combustion chambers 6 of the cylinders are as shown by the broken line in FIG. 9. The combination of these, that is, the flow rate of the air from the intake pipe part 8' to the combustion chambers 6 of all of the cylinders, is as shown by the solid line in FIG. 9. Further, the cylinder filling air amount Mc to for example the #1 cylinder corresponds to the part shown by hatching in FIG. 9.

As opposed to this, the average of the air flowing from the intake pipe part 8' to the combustion chambers 6 of all of the cylinders shown by the solid line is the cylinder intake air flow rate mc and is shown by the one-dot chain line in the figure. Further, the cylinder intake air flow rate mc shown by the one-dot chain line multiplied with the time $\Delta T_{180°}$ required for the crank shaft to rotate 180° in the case of four cylinders (that is, in a four-stroke type internal combustion engine, the angle 720° of rotation of the crank shaft in one cycle divided by the number of cylinders) becomes the cylinder filling air amount Mc. Therefore, by multiplying the cylinder intake air flow rate mc calculated by the intake valve model M23 with $\Delta T_{180°}$, the cylinder filling air amount Mc can be calculated (Mc=mc·$\Delta T_{180°}$). Further, by dividing this cylinder filling air amount Mc by the mass of the air occupying a volume corresponding to the volume of exhaust per cylinder in a state of 1 atm and 25° C., the cylinder air filling rate Kl can be calculated. In this way, the cylinder filling air amount Mc, cylinder intake air flow rate mc, and cylinder air filling rate Kl are proportional to each other in relationship. If finding any one of these, the values of the others can be found. That is, these values can be converted to each other.

Note that, in this description, the intake air amount of the internal combustion engine is the amount of air taken into the combustion chambers of all of the cylinders of the internal combustion engine (during operation). This can also be expressed using any of the cylinder filling air amount Mc, cylinder intake air flow rate mc, and cylinder air filling rate Kl.

However, in the present embodiment, as explained above, the valve lift changer 14 or operating timing shifter 15 enables opening characteristics of an intake valve 2 (lift, operating angle, valve timing) to be controlled, while the throttle valve 12 enables the downstream side intake pipe internal pressure to be controlled. Further, by cooperatively controlling the opening characteristics and opening degree of the throttle valve 12 (more specifically, the intake pipe internal pressure on the downstream side of the throttle valve), the intake air amount is controlled. That is, the throttle valve and the opening characteristic control means constituted by the valve lift changer 14 and operating timing shifter 15 cooperate to control the intake air amount. Further, in the present embodiment, at the time of such intake air amount control, the above-mentioned model equations are utilized for control. Below, the specific method will be explained with reference to the flow chart of FIG. 10.

Figure 10:
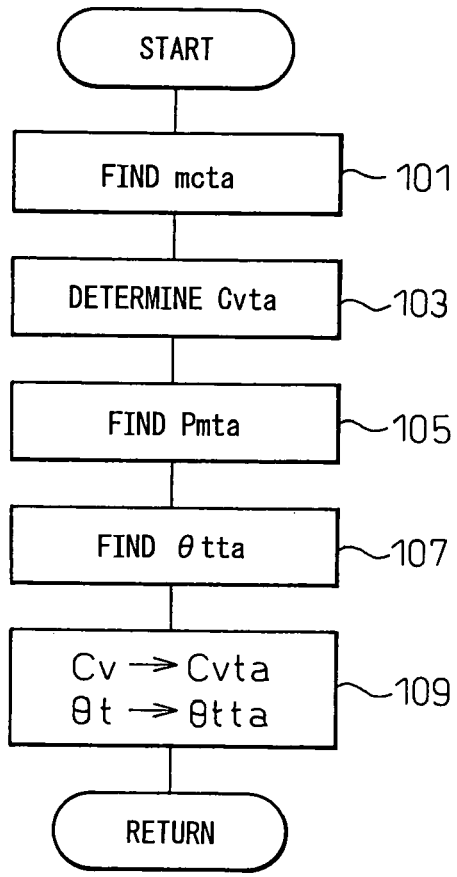
FIG. 10 is a flow chart of a control routine of intake air amount control in an embodiment of the present invention.

FIG. 10 is a flow chart of the control routine for intake air amount control in the present embodiment. This control routine is executed by the ECU 28 by interruption every predetermined time, that is, every control period Ts.

When this control routine starts, first, at the step 101, the target intake air amount mcta to be realized after the elapse of a time corresponding to the control period Ts is found. Note that, as explained above, the intake air amount can be expressed using any of the cylinder filling air amount Mc, cylinder intake air flow rate mc, and cylinder air filling rate Kl, but in the following explanation, this is expressed using the cylinder intake air flow rate mc. Therefore, the target intake air amount mcta is more specifically the cylinder intake air flow rate mc to be realized after the elapse of a time corresponding to the control period Ts.

This target intake air amount mcta may be found by preparing in advance a map linking the operating state of the internal combustion engine, more specifically, the engine speed NE and accelerator depression L, with the required torque TQr and a map linking the required torque TQr with the target intake air amount mcta and finding the value based on these maps, but in the present embodiment, this is found as follows.

That is, in the present embodiment, a map for finding the throttle opening degree θtb in the case where the opening characteristic is set to a predetermined reference state (that is, the reference target throttle opening degree) from the engine speed NE and accelerator depression L is prepared in advance and stored in the ECU 28. Here, the reference state, for example, can be made the standard valve lift or operating angle and operating timing in an ordinary engine not having a valve lift changer 14 or operating timing shifter 15.

Further, first, a reference target throttle opening degree θtb is found based on the map for finding the reference target throttle opening degree θtb from the engine speed NE and accelerator depression L. Further, this reference target throttle opening degree θtb is used to determine the model equation (equation (1)) of the above-mentioned throttle model (following equation (15)).

$$mtb = F(\theta tb) \cdot \frac{Pac}{\sqrt{R \cdot Ta}} \cdot \Phi\left(\frac{Pm}{Pac}\right) \tag{15}$$

On the other hand, if the opening characteristics are set to predetermined reference states, the compliance parameters A and B of the model equation (equation (14)) of the above-mentioned intake valve model are determined from the engine speed NE etc. and that model equation is determined. If the compliance parameters A and B are set to Ab and Bb, the following equation (16) is obtained.

$$mcb = Ab \cdot Pm - Bb \tag{16}$$

Further, the state where the intake air amount becomes the target intake air amount is the convergence state. At that time, the throttle valve passage air flow rate mt and cylinder intake air flow rate mc become equal. Therefore, if finding the cylinder intake air flow rate mcb at the time when the throttle valve passage air flow rate mtb obtained from the model equation (equation (15)) of the throttle model determined in this way and the cylinder intake air flow rate mcb obtained from the model equation (equation (16)) of the intake valve model obtained in this way become equal for the same downstream side intake pipe internal pressure Pm, this can be called the target intake air amount mcta.

Figure 11:
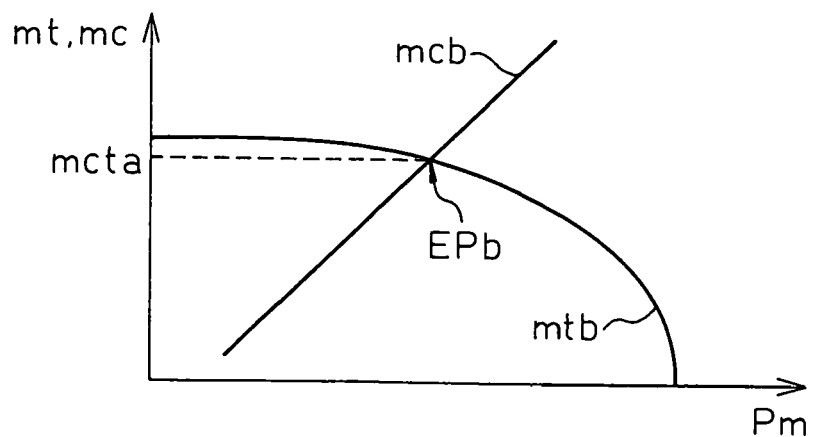
FIG. 11 is a view relating to step 101 of the control routine of FIG. 10 and shows a target intake air amount mcta.

Further, finding the target intake air amount mcta in the above way is synonymous with finding the intersecting point EPb between the curve mtb expressed by the model equation (equation (15)) of the throttle model determined in the above way and the line mcb expressed by the model equation (equation (16)) of the intake valve model determined in this way and finding the coordinate of the ordinate of the point EPb, as illustrated in FIG. 11. Here, when finding the intersecting point EPb, if using the equation expressing the curve mtb (equation (15)) as it is to try to find the intersecting point EPb, the calculation would become extremely complicated. Therefore, to simplify the calculation, it is also possible to approximate the equation expressing the curve mtb (equation (15)) by a plurality of linear equations of the downstream side intake pipe internal pressure Pm. That is, the curve mtb is approximated by a plurality of lines. Specifically, for example, the throttle valve passage air flow rates mtb are calculated at predetermined intervals of the downstream side intake pipe internal pressure Pm based on the equation expressing the curve mtb (equation (15)) to find points on the curve mtb at the predetermined intervals of the downstream side intake pipe internal pressure Pm and the lines connecting adjoining points are used as lines approximating the curve mtb. Further, the linear equations expressing these approximation lines become linear approximation equations of the equation expressing the curve mtb (equation (15)).

In this respect, the equation expressing the curve mtb is approximated to linear equations to facilitate finding the intersecting point EPb. What is necessary here is a linear approximation equation near the intersecting point EPb. Therefore, it is also possible to find just this linear approximation equation. In this case, by also finding in advance the cylinder intake air flow rates mcb at predetermined intervals of the downstream side intake pipe internal pressure Pm based on the equation expressing the line mcb (equation (16)) and finding where the magnitudes of the throttle valve passage air flow rate mtb and cylinder intake air flow rate mcb invert, the position of the intersecting point EPb can be identified.

That is, the linear approximation equation near the intersecting point EPb (that is, in the part where the magnitudes of the throttle valve passage air flow rate mtb and cylinder intake air flow rate mcb invert), for example, is made a linear equation expressing a line connecting the two points on the curve mtb around the point on the curve mtb where the magnitudes of the throttle valve passage air flow rate mtb and cylinder intake air flow rate mcb invert.

Note that, as will probably be understood from the above explanation, if making the reference state the standard valve lift or operating angle and operating timing in an ordinary engine not having the valve lift changer 14 and operating timing shifter 15 and using the above method to find the target intake air amount mcta, it is possible to find the intake air amount the same as the intake air amount intended by the driver by a certain accelerator depression Lc in an ordinary engine as the target intake air amount mcta for the same accelerator depression Lc in the present embodiment.

If the target intake air amount mcta is found at step 101, at the next step 103, the target opening characteristic Cvta of the intake valve 2, that is, the target lift Ltta and target operating angle Sata, and the target operating timing shift Vtta (that is, the amount of advance or delay from the reference operating timing due to the displacement by the operating timing shifter) are determined. Note that, as clear from the above explanation, in the present embodiment, the lift Lt and the operating angle Sa are in a predetermined relationship. If the operating angle Sa is determined, the lift Lt is also determined, so when determining the target lift Ltta and target operating angle Sata, in practice the target operating angle Sata is determined using the map.

More specifically, at step 103, the target operating angle Sata and target operating timing shift Vtta are determined based on a map prepared so as to obtain an operating angle Sa and operating timing shift Vt whereby the fuel efficiency, emission, torque fluctuation, and other conditions become optimally combined for the engine speed NE, target intake air amount mcta, etc. This map is found in advance by experiments etc. and stored in the ECU 28.

When the target opening characteristic Cvta is determined at step 103, at the next step 105, the target intake pipe internal pressure Pmta is found. This target intake pipe internal pressure Pmta is the intake pipe internal pressure on the downstream side of the throttle valve Pm for realizing the target intake air amount mcta when the opening characteristic Cv of the intake valve 2 is set to the target opening characteristic Cvta.

Further, in the present embodiment, this target intake pipe internal pressure Pmta is found as follows using the model equation of the above-mentioned intake valve model (equation (14)). That is, first, the opening characteristic Cv is assumed to be set to the target opening characteristic Cvta, the compliance parameters A and B of the model equation of the above-mentioned intake valve model (equation (14)) are determined from the engine speed NE etc., and that model equation is determined. That is, if the compliance parameters A and B are determined as Af and Bf, the following equation (17) is obtained.

$$mcf = Af \cdot Pm - Bf \quad (17)$$

Further, the target intake pipe internal pressure Pmta is the downstream side intake pipe internal pressure Pm for realizing the target intake air amount mcta in this equation (17), so can be expressed as in the following equation (18) based on equation (17).

$$Pmta = \frac{mcta + Bf}{Af} \quad (18)$$

Figure 12:
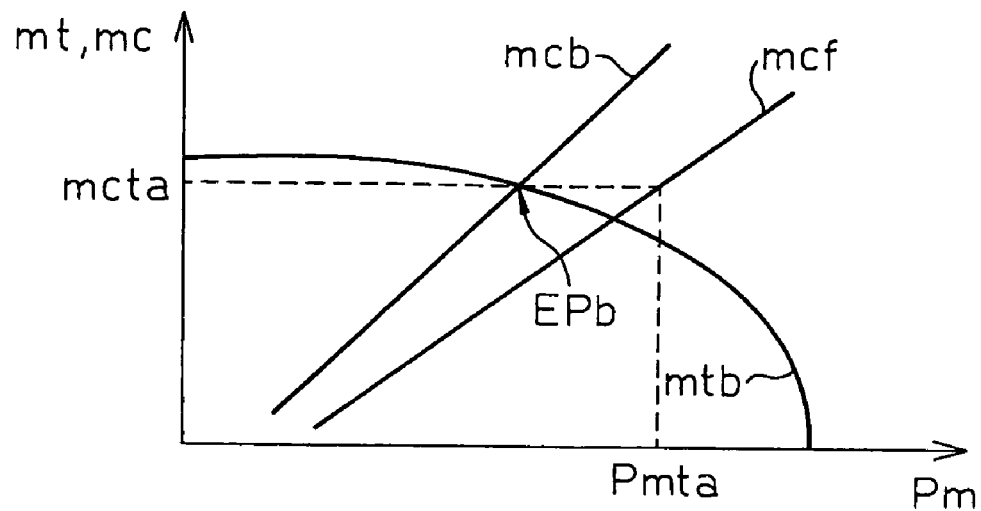
FIG. 12 is a view relating to step 105 of the control routine of FIG. 10 and shows a target intake pipe internal pressure Pmta.

If illustrating the line mcf expressed by the model equation of the intake valve model (equation (17)) and the target intake pipe internal pressure Pmta in the case where the opening characteristic Cv is set to the target opening characteristic Cvta, the result becomes for example as shown in FIG. 12.

When the target intake pipe internal pressure Pmta is found at step 105, at the next step 107, the target throttle opening degree θtta is found. This target throttle opening degree θtta is the throttle opening degree θt for making the downstream side intake pipe internal pressure Pm the target intake pipe internal pressure Pmta. In the present embodiment, this target throttle opening degree θtta can be found as follows using the model equation (equation (2)) of above-mentioned throttle model.

That is, when making the throttle opening degree θt the target throttle opening degree θtta, the downstream side intake pipe internal pressure Pm should converge to the target intake pipe internal pressure Pmta and the throttle valve passage air flow rate mt should converge to the target intake air amount mcta, so the following equation (19) stands.

$$mcta = F(\theta tta) \cdot \frac{Pac}{\sqrt{R \cdot Ta}} \cdot \Phi\left(\frac{Pmta}{Pac}\right) \quad (19)$$

Further, equation (19) can be modified as in the following equation (20).

$$F(\theta tta) = \frac{mcta}{\frac{Pac}{\sqrt{R \cdot Ta}} \cdot \Phi\left(\frac{Pmta}{Pac}\right)} \quad (20)$$

Further, here, the left side of equation (20) is a function of only the throttle opening degree θt, so by calculating the value of the right side of equation (20), it is possible to find the target throttle opening degree θtta based on equation (20). That is, for example, by conversely using the above-mentioned map finding the value of F(θt) from the throttle opening degree θt, it is possible to use the value calculated from the right side of equation (20) to find the target throttle opening degree θtta.

Note that the equation (20) can be rewritten to the following equation (21) if using the equation (8) and equation (18):

$$F(\theta tta) = \frac{mcta}{\left(\dfrac{Pa - \dfrac{f(mcta)}{ekpa \cdot ektha}}{\sqrt{R \cdot Ta}}\right) \cdot \Phi\left(\dfrac{mcta + Bf}{Pa - \dfrac{f(mcta)}{ekpa \cdot ektha}}\right)} \quad (21)$$

Figure 13:
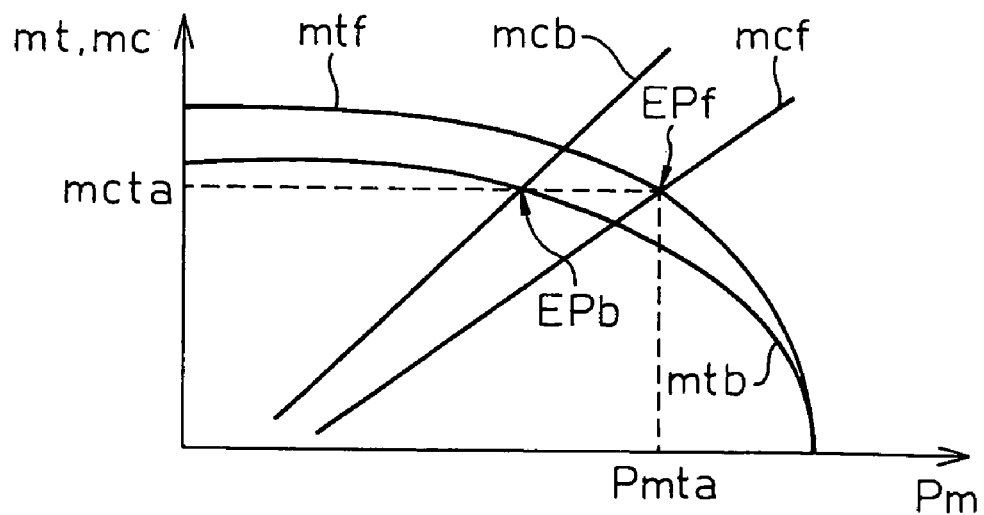
FIG. 13 is a view relating to step 107 in the control routine of FIG. 10.

Further, if entering the target throttle opening degree θtta found in the above way into the equation (2), the following equation (22) is obtained. Further, if illustrating the curve of the throttle passage air flow rate mtf expressed by this equation (22), a curve passing through the point EPf (Pmta, mcta) as shown in FIG. 13 is obtained.

$$mtf = F(\theta tta) \cdot \frac{Pac}{\sqrt{R \cdot Ta}} \cdot \Phi\left(\frac{Pm}{Pac}\right) \quad (22)$$

When the target throttle opening degree θtta is found at step 107, at the next step 109, the valve lift changer 14 and operating timing shifter 15 are controlled so that the opening characteristic Cv of the intake valve 2 becomes the target opening characteristic Cvta and the throttle valve 12 is controlled so that the throttle opening degree θt becomes the target throttle opening degree θtta. Due to this, the intake air amount is controlled to become the target intake air amount mcta. Further, when ending step 109, the routine returns to step 101 from where similar control is repeated.

Note that in the present embodiment, the valve lift changer 14 and operating timing shifter 15 only enable the opening characteristics of an intake valve 2 to be changed and do not enable the opening characteristics of an exhaust valve 4 to be changed, but in another embodiment, it is also possible to provide a valve lift changer and operating timing shifter for an exhaust valve to change the opening characteristics of an exhaust valve 4.

Further, above, the case of controlling the intake air amount by cooperative control of the throttle valve 12 and a variable valve operation mechanism such as the valve lift changer 14 and operating timing shifter 15 was explained as an example, but the present invention is not limited to this. The invention may also be applied to the case of control of the intake air amount by cooperation between the throttle valve and an intake air amount changing means other than a variable valve operation mechanism, for example, a variable cylinder number mechanism or variable exhaust volume mechanism. That is, if suitably determining the compliance parameters A and B of the model equations of the intake valve model in accordance with the setting of these intake air amount changing means, it is possible to find the target intake air amount or target throttle opening degree in the same way as the case of the above-mentioned variable valve operation mechanism.

Note that, the present invention was described in detail based on a specific embodiment, but a person skilled in the art can make various changes, modifications, etc. to this without departing from the claims and concept of the present invention.

The invention claimed is:

1. An apparatus for controlling an intake air amount in an internal combustion engine provided with a throttle valve and an intake air amount changing means linked with said throttle valve,
said intake air amount control apparatus for an internal combustion engine being provided with model equations creating a model of an engine intake system and expressing air passing through said engine intake system and
further having
a means finding a target intake air amount based on an accelerator opening degree and engine speed,
a means for determining a target setting for said intake air amount changing means based on at least said target intake air amount, and
a means for finding a target throttle opening degree, which is a throttle opening degree for realizing said target intake air amount, from said target intake air amount and said target setting based on said model equations.

2. An intake air amount control apparatus as set forth in claim 1, wherein said means for finding the target throttle opening degree has a means for finding a target intake pipe internal pressure, which is an intake pipe internal pressure at a downstream side of throttle valve for realizing said target intake air amount when said intake air amount changing means is set to said target setting, based on said target intake air amount and said target setting, and a means for finding said target throttle opening degree based on said target intake air amount and said target intake pipe internal pressure.

3. An intake air amount control apparatus as set forth in claim 1, wherein as said model equations, the apparatus has
a first equation expressing a relationship between the intake pipe internal pressure on the downstream side of the throttle valve and a throttle valve passage air flow rate and determined in accordance with a throttle opening degree and
a second equation expressing a relationship between the intake pipe internal pressure on the downstream side of the throttle valve and a cylinder intake air flow rate and determined in accordance with at least a setting of said intake air amount changing means and an engine speed.

4. An intake air amount control apparatus as set forth in claim 3, wherein said means for finding the target intake air amount has a means for finding a reference target throttle opening degree, which is a target throttle opening degree in the case where said intake air amount changing means is set to a predetermined reference state, based on said accelerator opening degree and said engine speed, finds said cylinder intake air flow rate for when the throttle valve passage air flow rate found based on said first equation determined by the reference target throttle opening degree found by said means for finding the reference target throttle opening degree and the cylinder intake air flow rate found based on said second equation determined by at least the engine speed assuming that said intake air amount changing means is set to said reference state become equal with respect to the same intake pipe internal pressure at the downstream side of the throttle valve, and makes said cylinder intake air flow rate the target intake air amount or makes a value converted from said cylinder intake air flow rate the target intake air amount.

5. An intake air amount control apparatus as set forth in claim 3, wherein said means for finding the target throttle opening degree has a means for finding a target intake pipe internal pressure, which is the intake pipe internal pressure on the downstream side of the throttle valve for realizing said target intake air amount when said intake air amount changing means is set to said target setting, based on said target intake air amount and said target setting, and said means for finding the target intake pipe internal pressure finds said target intake pipe internal pressure by entering said target intake air amount expressed by the cylinder intake air flow rate into said second equation determined by at least the engine speed assuming that said intake air amount changing means is set to said target setting.

6. An intake air amount control apparatus as set forth in claim 5, wherein said means for finding the target throttle opening degree further has a means for finding said target throttle opening degree based on said target intake air amount and said target intake pipe internal pressure, and said means uses said target intake air amount expressed by the cylinder intake air flow rate and said target intake pipe internal pressure to find said target throttle opening degree based on said first equation.

7. An intake air amount control apparatus as set forth in claim 1, wherein said intake air amount changing means is an opening characteristic control means for controlling an opening characteristic of at least one of an intake valve and exhaust valve.

8. A method for controlling an intake air amount in an internal combustion engine provided with a throttle valve and an intake air amount changing means linked with said throttle valve,
said intake air amount control method for an internal combustion engine provided with
a step of finding a target intake air amount based on an accelerator opening degree and engine speed,
a step determining a target setting for said intake air amount changing means based on at least said target intake air amount, and a step of finding a target throttle opening degree, which is a throttle opening degree for realizing said target intake air amount, from said target intake air amount and said target setting based on model equations creating a model of an engine intake system and expressing air passing through said engine intake system.

9. An intake air amount control method as set forth in claim 8, wherein said step of finding the target throttle opening degree has a step of finding a target intake pipe internal pressure, which is an intake pipe internal pressure at a downstream side of the throttle valve for realizing said target intake air amount when said intake air amount changing means is set to said target setting based on said target intake air amount and said target setting, and a step of finding said target throttle opening degree based on said target intake air amount and said target intake pipe internal pressure.

10. An intake air amount control method as set forth in claim 8, wherein the method at least uses, as said model equations,
a first equation expressing a relationship between the intake pipe internal pressure on the downstream side of the throttle valve and a throttle valve passage air flow rate and determined in accordance with a throttle opening degree and
a second equation expressing a relationship between the intake pipe internal pressure on the downstream side of the throttle valve and a cylinder intake air flow rate and determined in accordance with at least a setting of said intake air amount changing means and an engine speed.

11. An intake air amount control method as set forth in claim 10, wherein
said step of finding the target intake air amount has a step of finding a reference target throttle opening degree, which is a target throttle opening degree in the case where said intake air amount changing means is set to a predetermined reference state, based on said accelerator opening degree and said engine speed,
in said step of finding the target intake air amount, said cylinder intake air flow rate is found for when the throttle valve passage air flow rate found based on said first equation determined by said reference target throttle opening degree and the cylinder intake air flow rate found based on said second equation determined by at least the engine speed assuming that said intake air amount changing means is set to said reference state become equal with respect to the same intake pipe internal pressure at the downstream side of the throttle valve, said cylinder intake air flow rate is made the target intake air amount, or a value converted from said cylinder intake air flow rate is made the target intake air amount.

12. An intake air amount control method as set forth in claim 10, wherein
said step of finding the target throttle opening degree has a step of finding a target intake pipe internal pressure, which is the intake pipe internal pressure on the downstream side of the throttle valve for realizing said target intake air amount when said intake air amount changing means is set to said target setting, based on said target intake air amount and said target setting,
in said step of finding the target intake pipe internal pressure, said target intake pipe internal pressure is found by entering said target intake air amount expressed by the cylinder intake air flow rate into said second equation determined by at least the engine speed assuming that said intake air amount changing means is set to said target setting.

13. An intake air amount control method as set forth in claim 12, wherein
said step of finding the target throttle opening degree further has a step of finding said target throttle opening degree based on said target intake air amount and said target intake pipe internal pressure,
in said step of finding said target throttle opening degree, said target intake air amount expressed by the cylinder intake air flow rate and said target intake pipe internal pressure are used to find said target throttle opening degree based on said first equation.

14. An intake air amount control method as set forth in claim 8, wherein said intake air amount changing means is an opening characteristic control means for controlling an opening characteristic of at least one of an intake valve and exhaust valve.

* * * * *